United States Patent
Brady et al.

(10) Patent No.: US 10,477,137 B2
(45) Date of Patent: Nov. 12, 2019

(54) ARRAY CAMERA IMAGING SYSTEM HAVING DISTRIBUTED MEMORY

(71) Applicant: Aqueti Incorporated, Durham, NC (US)

(72) Inventors: David Jones Brady, Durham, NC (US); Scott Thomas McCain, Durham, NC (US); Steven Douglas Feller, Durham, NC (US)

(73) Assignee: Aqueti Incorporated, Durham, NC (US)

( * ) Notice: Subject to any disclaimer, the term of this patent is extended or adjusted under 35 U.S.C. 154(b) by 0 days.

(21) Appl. No.: 15/777,816

(22) PCT Filed: May 20, 2016

(86) PCT No.: PCT/US2016/033448
§ 371 (c)(1),
(2) Date: May 21, 2018

(87) PCT Pub. No.: WO2017/200547
PCT Pub. Date: Nov. 23, 2017

(65) Prior Publication Data
US 2018/0338108 A1   Nov. 22, 2018

(51) Int. Cl.
*H04N 5/765*  (2006.01)
*G06T 3/40*  (2006.01)
*H04N 5/247*  (2006.01)
*H04N 5/265*  (2006.01)
*H04N 5/76*  (2006.01)

(52) U.S. Cl.
CPC ............ *H04N 5/765* (2013.01); *G06T 3/40* (2013.01); *G06T 3/4038* (2013.01); *H04N 5/247* (2013.01); *H04N 5/265* (2013.01); *H04N 5/7605* (2013.01)

(58) Field of Classification Search
CPC ........ H04N 5/765; H04N 5/247; H04N 5/265; H04N 5/7605
See application file for complete search history.

(56) References Cited

U.S. PATENT DOCUMENTS 8,259,212 B2   9/2012   Brady et al.
2007/0188653 A1  8/2007   Pollock et al.
(Continued)

OTHER PUBLICATIONS

Authorized Officer: Lee W. Young, "International Search Report and Written Opinion" issued in parent PCT application No. PCT/US16/33448, dated Aug. 26, 2016.

*Primary Examiner* — Twyler L Haskins
*Assistant Examiner* — Angel L Garces-Rivera
(74) *Attorney, Agent, or Firm* — Kaplan Breyer Schwarz, LLP (57) ABSTRACT

An array-camera imaging system and method for producing a rendered image are presented, wherein the system includes a plurality of imagers, a plurality of image processors, and a plurality of memory modules that are networked with the image processors via a communications bus. Each image processor provides processed and processed image data from at least one imager to the memory modules. Preferably, the processed image data is distributed among the memory modules at multiple resolution scales. In response to a request from an image rendering system, image data is read out from the memory modules at the resolution scale of the request.

18 Claims, 5 Drawing Sheets

(56) References Cited

U.S. PATENT DOCUMENTS

| | | | |
|---|---|---|---|
| 2010/0171866 A1* | 7/2010 | Brady | H04N 5/2254 |
| | | | 348/340 |
| 2012/0242788 A1* | 9/2012 | Chuang | G08B 13/19602 |
| | | | 348/36 |
| 2012/0274821 A1 | 11/2012 | Mizutani et al. | |
| 2014/0313227 A1 | 10/2014 | Wilkinson | |
| 2014/0313277 A1 | 10/2014 | Yarosh et al. | |
| 2015/0055929 A1 | 2/2015 | Van Hoff et al. | |

* cited by examiner

ARRAY CAMERA IMAGING SYSTEM HAVING DISTRIBUTED MEMORY

FIELD OF THE INVENTION

The present invention relates to imaging in general, and, more particularly, to forming images with camera systems having a plurality of sensor arrays.

BACKGROUND OF THE INVENTION

The advent of digital imaging has enabled advances in the way that an image of a scene can be recorded and viewed. In particular, in modern cameras, an image is not typically formed by exposing film-based photographic emulsions but, rather, by digitally recording an optical image of the scene using an electronic sensor array. As a result, the recording surface on which the image is focused by the camera optics no longer needs to be a single continuous surface. This has enabled the development of array cameras that comprise a plurality of digital cameras—each including a separate sensor array (a.k.a., a focal-plane array) that outputs a digital sub-image of a portion of the scene. The sub-images can then be combined digitally to form a composite image of the entire scene. For the purposes of this Specification, individual modules of an array camera are referred to as "microcameras," while the composite system is referred to as the "macrocamera," "array camera" or "camera." The fields of view of neighboring microcameras typically overlap such that some points in the scene are observed by multiple microcameras while other points may be observed by only a single microcamera.

A sensor array normally comprises a large two-dimensional array of optoelectronic detector pixels, such as charge-coupled device (CCD) elements, photodetectors, etc. The sensor array generates a digital image-data set based on the sub-image formed on its recording surface during image capture.

Pixel count is a basic measure of image quality and, for typically sensor arrays, are within the range of 1-20 million pixels. For video applications, each individual camera of an array camera outputs up to 500 frames per second. As a result, each microcamera provides 1000-10,000 megapixels worth of data every second and a macrocamera may generate many gigapixels per second.

Array cameras form images from composite data provided by one or more microcameras. The composite images enable creation of high-resolution panoramic images or digital fly effects in which the view point might move from one camera to the next. The full range of scene pixels captured by the array camera is called the "data cube." In general, the full data cube is too large to display on a single display device. Rather, viewers or video analysis systems interactively pan or move their viewpoint through the data cube. The image or video on a display device is composited from pixels captured by one, several or all the microcameras. When the display device or analysis system renders images from all microcameras, low-resolution streams from individual microcameras are required. When the display device zooms to data from a smaller number of microcameras, higher-resolution streams from each microcamera are observed. In the typical array-camera architecture, data is streamed from the array to storage and then read out of storage to render one or more display data streams. Unfortunately, assembling large, composite images from multiple smaller sub-images is very computationally intensive due to the geometrical and radiometric processing of the sub-images that is required to stitch the sub-images together. Further, when the sub-images are often taken at different times, the illumination of the scene can change or there can be motion artifacts associated with objects moving within the field-of-view. As a result, algorithms that compare neighboring images are required in order to mitigate seams between sub-images due to these variations. In addition, distortion, pointing, and non-linearity corrections must be applied to the sub-images.

Such extensive processing imposes a severe time constraint, however, which has historically precluded using multiple sensor arrays for video-rate capture of high-resolution, high-pixel-count imagery. To date, therefore, high-definition video streams have been principally limited to single-sensor-array camera acquisition. As a result, in video-rate applications, numerous separately controlled cameras are typically used to capture a complete scene, where each camera provides only a small-area view of a portion of the scene. For example, a sports broadcast normally relies on the use of many different cameras that are strategically positioned and oriented throughout an arena or stadium. Each camera requires its own camera operator and the multiple camera views must be continuously analyzed in real time by a director who chooses which one camera view is broadcast. In addition to giving rise to inordinate capital and operational expense, such an approach limits the "richness" of the viewing experience.

SUMMARY OF THE INVENTION

The present invention enables high-speed capture and rendering of large-area, high-pixel-count images of a scene using an imaging system having multiple imagers and image data storage across an array of memory modules. Embodiments of the present invention are particularly well suited for use in high-definition video-recording systems with application to digital broadcasting, security and machine vision.

In the prior art, array camera systems include multiple digital cameras, each of which includes its own image processing and memory system. Each image processor provides a sub-image of a portion of a scene to an image aggregator at a fixed resolution scale. The image aggregator stitches the sub-images together, using overlap regions between adjacent sub-images, to form a composite image of the entire scene. Unfortunately, the data-management, processing, and transmission requirements of such systems severely limits the size and/or resolution of the composite image that can be displayed and transmitted. The image processing effort associated with stitching the multiple sub-images into a single composite image gives rise to latencies that preclude many applications, including high-resolution video streaming.

The present invention overcomes some of the disadvantages of the prior art by employing a shared, distributed memory architecture to store image data provided by the imagers of an array camera. Preferably, the image data from each imager is stored across a plurality of memory modules.

An illustrative embodiment of the present invention comprises a plurality of imagers, processors, and memory modules, the processors and memory modules are connected via a common communications bus, which also provides the output of the array camera to image rendering computers. The imagers and processors are interconnected such that each imager processes image data from multiple imagers and stores the processed image data across multiple memory modules. In some embodiments, at least one imager is interconnected to more than one processor.

The processors store image data from each imager across a plurality of memory modules at multiple resolution scales to facilitate rapid read-out of the image data and enable image rendering suitable for video streaming. In some embodiments, the image data is stored in the memory modules using wavelet-based compression. High-speed image rendering, suitable for video streaming, is enabled by reading out image data from the memory modules at the resolution scale requested by the image rendering computer.

In some embodiments, low-resolution image data from multiple imagers is drawn from across numerous memory modules. In some embodiments, high-resolution image data from only one, or a few, imagers is drawn from as few as one memory module. By distributing image data at different resolution scales across a number of memory modules that is based on the resolution scale, the data read-out load is substantially evenly distributed across the memory module array.

In some embodiments, for each imager, the image-data set that defines each video frame in a video stream is stored in a round-robin storage approach. In this approach, every set of N frames from each imager are spread across the set of memory modules (where N is the number of memory modules) such that each memory module stores one of the N frames. By storing the first image-data set in the N frames in a different memory module, the bandwidth requirements for both capture and rendering read-out can be kept substantially constant. Further, such a storage approach provides inherent data redundancy since, should one memory module fail, only the image-data set for the $N^{th}$ video frame from each imager would be lost, rather than the full video stream from a single imager.

An embodiment of the present invention is a system for forming an image of a scene, the system comprising: (1) a plurality of imagers that is operative for providing a plurality of image-data sets, each imager including: a first lens; and a sensor array that is operative for receiving an optical sub-image of the scene from the first lens and providing an image-data set of the plurality thereof, the image-data set being based on the received optical sub-image; (2) a plurality of image processors that is operative for receiving the plurality of image-data sets and providing a plurality of processed image-data sets, each of the image processors being operatively coupled with at least two imagers of the plurality thereof such that it receives at least two image-data sets of the plurality thereof; and (3) a plurality of memory modules, each of the plurality of memory modules being operative for storing a processed image-data set from each of at least two of the plurality of imagers.

Another embodiment of the present invention is a method for forming an image of a scene, the method comprising: providing a plurality of imagers, each imager comprising a sensor array and a lens that forms an optical sub-image of the scene on the sensor array; providing a plurality of first image-data sets, wherein each first image-data set of the plurality thereof is based on a different optical sub-image of the plurality thereof; and storing the plurality of first image-data sets in a plurality of memory modules such that each first image-data set is distributed among a plurality of memory modules.

DETAILED DESCRIPTION

Figure 1A:
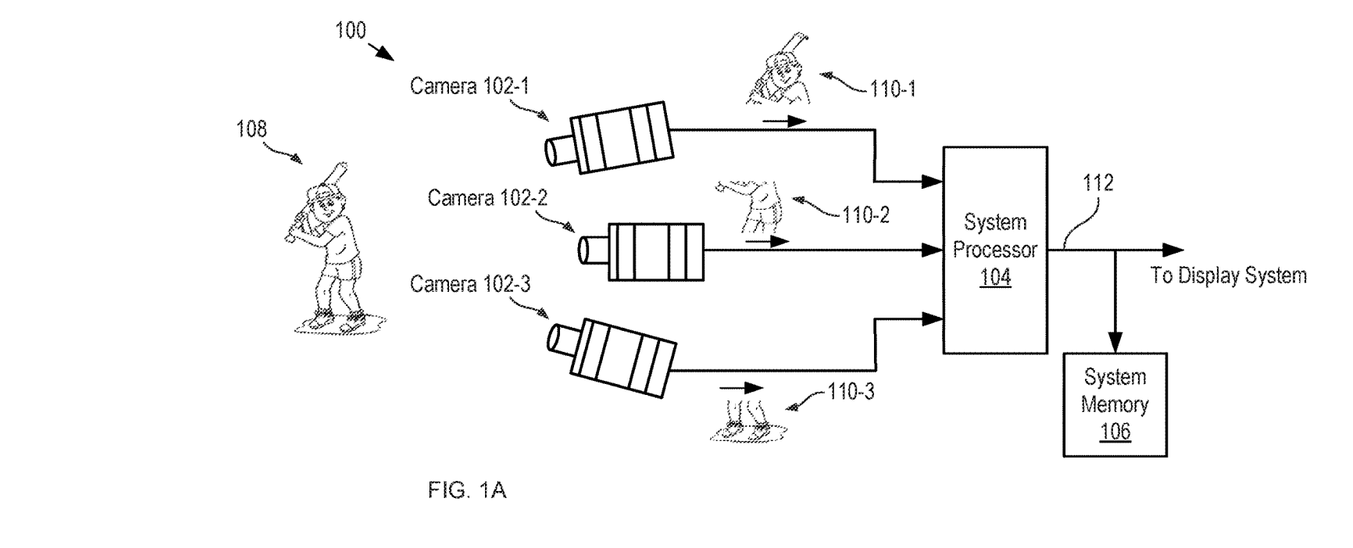
FIGS. 1A-B depict schematic drawings of a conventional video array-camera and an individual camera of the array, respectively.
Figure 1B:
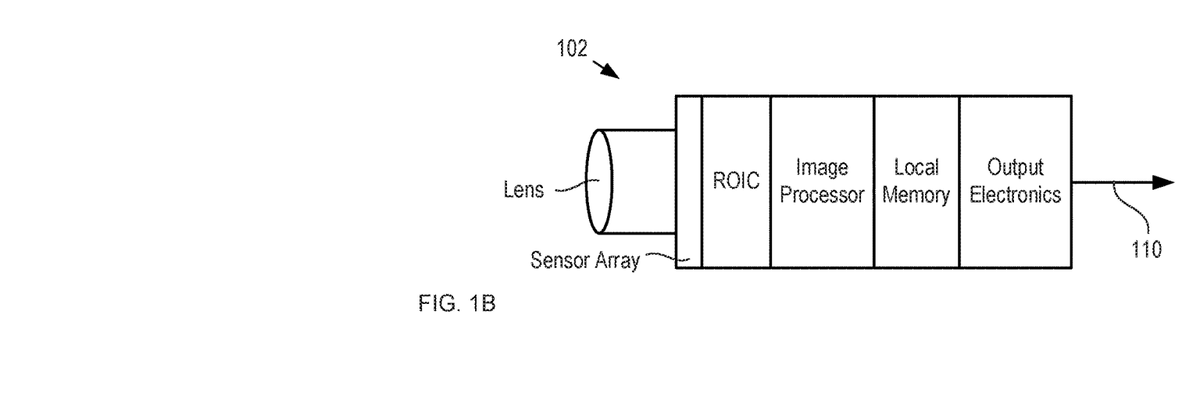

FIGS. 1A-B depict schematic drawings of a conventional video array-camera and an individual camera of the array, respectively. Array camera 100 includes a plurality of microcameras 102-1 through 102-3, system processor 104, and system memory 106.

Each of microcameras 102-1 through 102-3 (referred to, collectively, as microcameras 102) is a conventional digital video camera that includes independent image processing capability and memory. Each of microcameras 102 comprises an objective lens, sensor array, read-out integrated circuit (ROIC), image processor, local memory, and output electronics. Microcameras 102 are arranged such that each microcamera provides a video stream of a different portion of scene 108.

In each video frame of the video stream, the objective lens of each of microcameras 102 forms an optical image of its respective portion of scene 108 on the recording surface of its respective sensor array.

The sensor array converts the optical image into image data representative of the portion of the scene viewed by that camera. The image data generated for each video frame collectively defines an image-data set.

The image data is read out by the ROIC, which is an integrated circuit specialized for reading out image data from a sensor array and converting it into a standard image format.

The output of the ROIC is processed at the image processor, which, among other things, adjusts its image properties (e.g., white/black levels, fixed-pattern noise, gamma, etc.), demosaics color images from the raw image data, and compresses the raw image data into a standard image format (e.g., JPEG, TIFF, PNG, HDMI, H.264, HVEC, etc.).

The processed image-data set is then stored in and/or sent to system processor 104 by the output electronics as digital sub-image 110. Typically, the camera memory is a long-term data storage device, such as a hard disk drive, solid-state memory, etc.

System processor 104 is an image aggregator that, for each video frame, receives the multiple sub-images from the microcameras and uses digital image stitching to form a composite image of scene 108 using regions of overlap in the fields of view of adjacent cameras to align them relative to one another. Typically, system processor 104 also adjusts the sub-images for brightness, contrast, and the like, so that they can be seamlessly combined into a single image. This aggregation and adjustment process occurs during each frame of a video stream to generate output signal 112, which is sent to memory 106 and/or is transmitted to a display system, such as one or more video monitors or streaming data networks. Typically, the output video stream is in a conventional format such as HDMI, H.264, HVEC, and the like.

Arraying multiple microcameras to image a scene provides many advantages over imaging the scene using a single high-resolution camera. First, since each microcamera 102 needs to view only a smaller portion of scene 108, it can employ a simpler optical design. Second, smaller sensor arrays can be used because the full scene image is formed of multiple smaller sized sub-images 110 and field curvature and image focus can be managed independently in each sub-image. This decreases the cost per detector pixel for the sensor arrays included in cameras 102.

Unfortunately, arraying microcameras as done in the prior art, such as embodied by array camera 100, also gives rise to significant digital data management issues—particularly for live video transmission. Typically, each sensor array includes 1-20 megapixels and operates at 1-500 video frames per second. Each microcamera 102, therefore, produces up to 1000 megapixels of data per second. As a result, array camera 100, as a whole, therefore produces 100 megapixels to 100 gigapixels of data per second. Processing, storing, transmitting and analyzing this data load is a formidable information-management challenge.

In addition, since each of microcameras 102 includes an independent local memory, high-resolution data would be drawn from a single memory module. As a result, that camera would be required to operate at extremely high bandwidth while other camera memories would remain idle. In some prior-art array cameras, the local memory of each microcamera is a long-term memory device, such as a solid-state memory (e.g., SD card, etc.) that must be physically removed from the microcamera and coupled with system processor 104 for image compositing. As a result, real-time processing of a composite image is simply not possible.

The present invention mitigates some of the problems associated with prior-art array cameras by exploiting the fact that the data streams provided by the microcameras of an array camera map well onto parallel computing systems. Embodiments of the present invention employ an interconnected network of imagers, image processors, and memory modules in which image data from the sensor arrays is stored in a shared-memory architecture. As a result, array cameras in accordance with the present invention can achieve significantly improved system performance.

Figure 2:
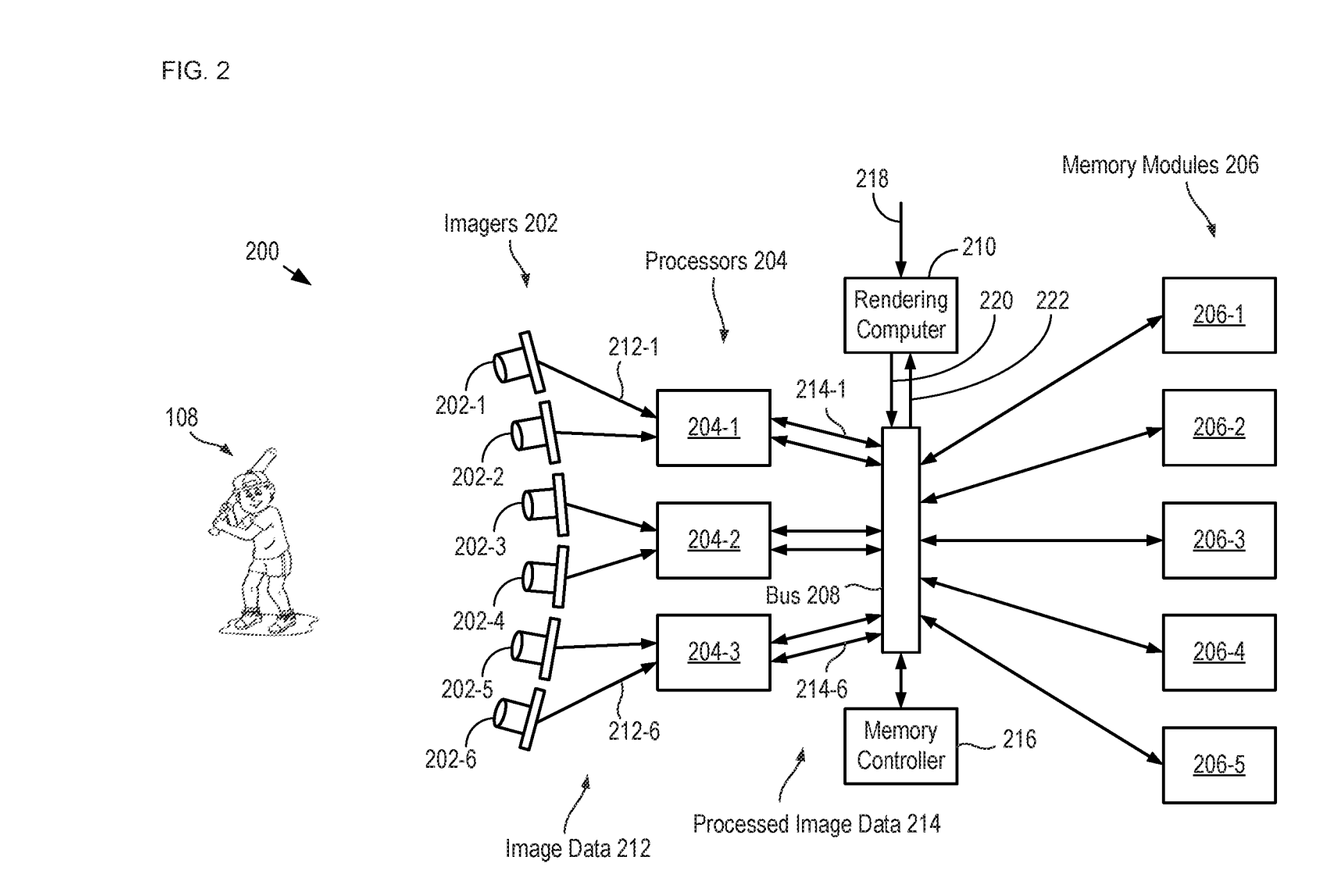
FIG. 2 depicts an array camera in accordance with an illustrative embodiment of the present invention.

FIG. 2 depicts an array camera in accordance with an illustrative embodiment of the present invention. Array camera 200 includes imagers 202-1 through 202-6, processors 204-1 through 204-3, memory modules 206-1 through 206-5, communications bus 208, rendering computer 210, and memory controller 216. It should be noted that the number of imagers, processors, and memory modules included in array camera 200 is merely exemplary and that any number of these devices can be included in an array camera without departing from the scope of the present invention. Further, although the illustrative embodiment includes a plurality of imagers that view scene 108 directly, it will be clear to one skilled in the art, after reading this Specification, how to specify, make, and use alternative embodiments wherein imagers 202 observe scene 108 through a common objective lens, such as systems described in "Multiscale Optical System," U.S. Pat. No. 8,259,212, which is incorporated herein by reference. Still further, in some embodiments, some of imagers 202 sample the same parts of the scene at diverse exposure levels or use diverse color filters or focus settings.

Figure 3:
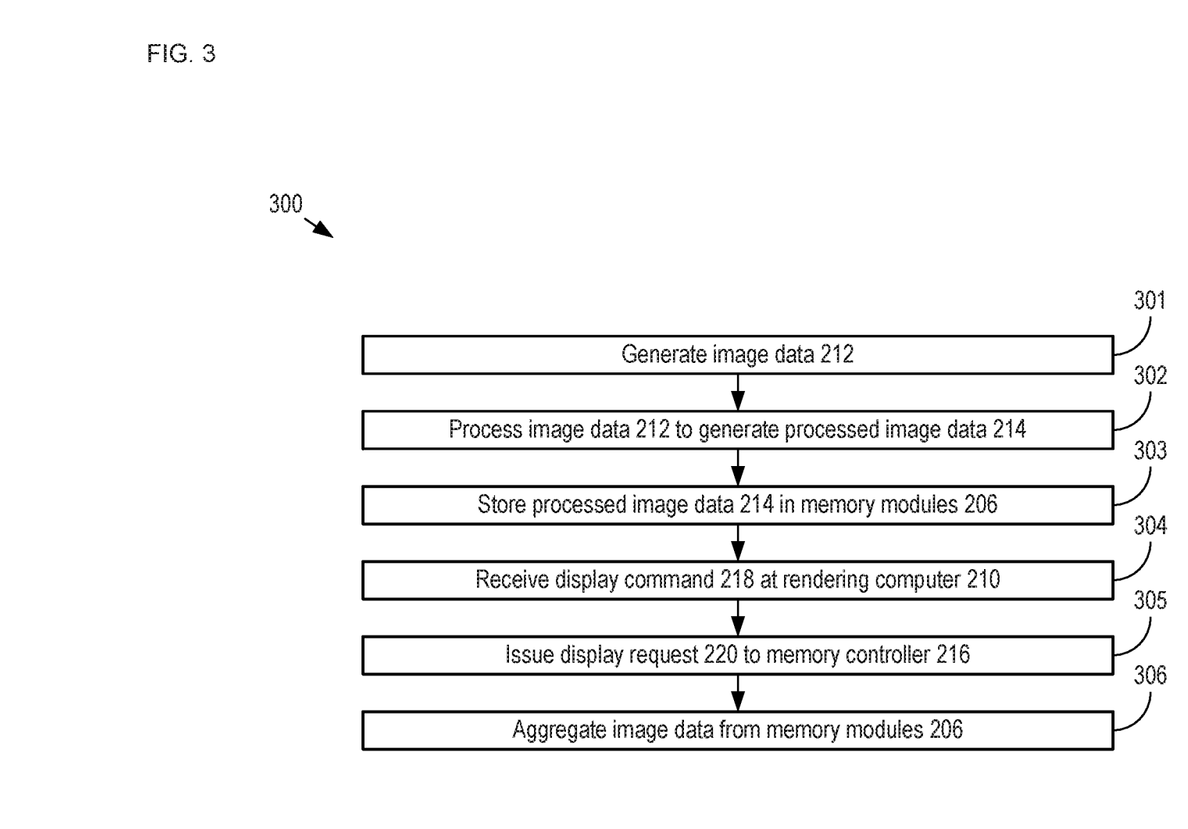
FIG. 3 depicts operations of a method for generating a digital video stream of a scene in accordance with the illustrative embodiment.

FIG. 3 depicts operations of a method for generating a digital video stream of a scene in accordance with the illustrative embodiment. Method 300 begins with operation 301, wherein, for each video frame in a video stream, imagers 202-1 through 202-6 generate image data 212 as image-data sets 212-1 through 212-6, respectively.

Each of imagers 202-1 through 202-6 (referred to, collectively, as imagers 202) includes a conventional objective lens and a sensor array. Imagers 202 are arranged such that image-data sets 212-1 through 212-6 correspond to different, overlapping, portions of scene 108. Although depicted as being arranged in a linear array, one skilled in the art will recognize, after reading this Specification, that imagers 202 can be arranged in a two-dimensional array.

It should be noted that, while the present invention is particularly well suited for use in visible- and infrared-light imaging systems, it also applicable to systems that image radiation having other wavelengths (e.g., x-rays, terahertz rays, mixed wavelengths, etc.) As a result, in some embodiments, array camera 200 includes one or more imagers whose sensor is sensitive to radiation other than visible or infrared light.

In contrast to the prior art, imagers 202 do not include local image processing capability or local memory. In the depicted example, ROICs are not included in imagers 202 and sensor-readout functionality is incorporated into processors 204. In some embodiments, an ROIC is included in at least one of imagers 202.

At operation 302, image-data sets 212-1 through 212-6 are processed by processors 204 to produce processed image data 214, which includes processed image-data sets 214-1 through 214-6.

Processors 204 are image processors operative for reading out image data and processing it to enable generation of a processed data stream that includes a sequence of processed image-data sets 214 and/or portions of one or more processed image-data sets. Processors 204 are analogous to conventional image processors, such as those described above and with respect to those included in prior-art cameras 102; however, in some cases, at least one of processors 204 does not compress the raw image data as part of the image processing process.

Typically, each processor includes local volatile memory for use in performing the image processing on the image data. Processors 204 are electrically coupled with imagers 202 such that each image processor receives image data from at least two different imagers. In some embodiments the output data sets may include derivatives of the image data such as feature descriptors, image analytics, and abstract data representations.

Although the illustrative embodiment depicts each sensor as operatively coupled to only one processor, in some embodiments, at least one imager 202 is electrically coupled with two or more processors 204 such that the image data generated by each such imager is processed, wholly or in part, by each of the plurality of processors to which it is operatively coupled. It should be noted that processed image data from each imager 202 is available to each of processors 204 through communications bus 208 and the bidirectional links between the processors and the bus, as indicated in FIG. 2.

In contrast to the prior-art, once processed, a full video stream comprising the processed image-data sets is not streamed out of camera 200 because, for an array camera having numerous imagers, no currently available display would be capable of showing the full resolution composite image.

At operation 303, processed image data 214 is stored in memory modules 206 via conventional communications bus 208. Image data 214 is stored in accordance with a routing table included in memory controller 216.

Memory controller 216 is a central processing system operative for routing data to memory locations across memory modules 206, as well as maintaining a global routing table for the stored data. In some embodiments, the routing table is implemented in at least one of processors 204 to map the distribution of data across memory modules 206. In some embodiments, the memory controller is implemented as part of the architecture of communications bus 208.

Each of memory modules 206 is a long-term memory module, such as a hard disk, solid-state memory, etc. In the illustrative embodiment, processed image data 214 is stored in memory modules 206 at multiple fixed resolution scales to facilitate its rapid retrieval for transmission of video at a desired resolution. Further, in the depicted example, the multiple resolution scales define a hierarchical tree of resolution scales. In some embodiments, the processed image data is stored at multiple resolution scales that do not collectively define a hierarchical tree of resolutions. In some embodiments, processed image data is stored in memory modules 206 using wavelet-based compression, such as JPEG2000, DjVu, ECW, CineForm, Dirac, and the like.

It should be noted that the use of a single, global memory controller is merely one way to implement the shared memory architecture of the present invention. In some embodiments, one or more of memory modules 206 includes a memory controller that serves as a global memory controller and, therefore, the inclusion of memory controller 216 is not necessary. In some embodiments, one or more of the memory modules and/or memory controllers is a removable module, which enables reconfiguration of the overall memory architecture of array camera 200.

Figure 4:
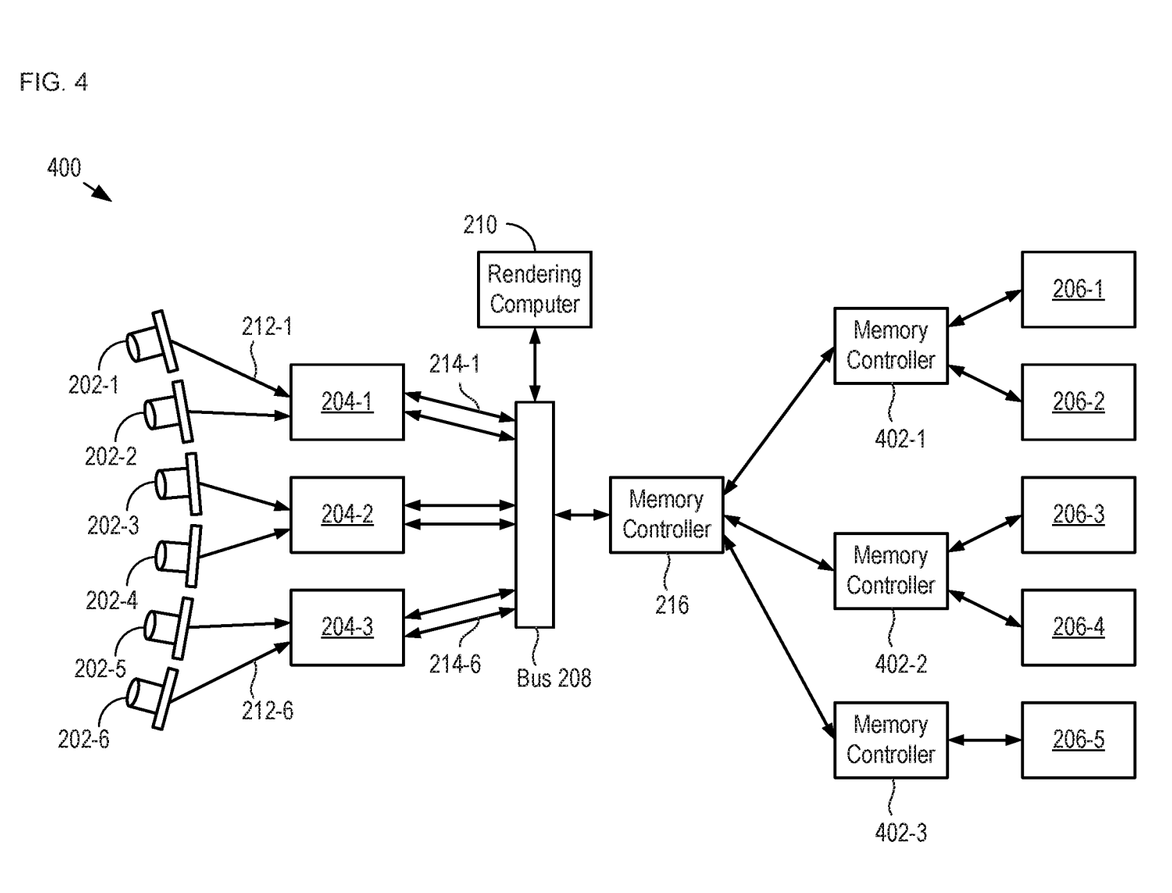
FIG. 4 depicts a portion of an array camera in accordance with an alternative embodiment of the present invention.

FIG. 4 depicts a portion of an array camera in accordance with an alternative embodiment of the present invention. Camera 400 includes a hierarchical memory controller architecture that enables the removal of individual memory modules, or groups of memory modules, without losing complete camera operability. Camera 400 includes imagers 202, processors 204, communications bus 208, memory controller 216, memory controllers 402-1 through 402-3, and memory modules 206.

Each of memory controllers 402-1 through 402-3 (referred to, collectively, as memory controllers 402) is analogous to memory controller 216. Each of memory controllers 402 is associated with one or a plurality of memory modules 206 to define a memory module group that can be removed from the camera. For example, memory controller 402-1 routs image data to memory locations across memory modules 206-1 and 206-2 and maintains a routing table for the data stored in those memory modules. When memory controller 402-1 and memory modules 206-1 and 206-2 are removed from camera 400 as a unit, memory controller 402-1 enables the image data stored in memory modules 206-1 and 206-2 to be accessed by an external processor or rendering computer. In similar fashion, memory controller 402-2 routs image data to memory locations across memory modules 206-3 and 206-4 and maintains a routing table for the data stored in those memory modules, while memory controller 402-3 routs image data to memory locations in memory module 206-5 maintains a routing table for the data stored in that memory module.

In analogous fashion to its operation described above and with respect to camera 200, memory controller 216 provides overall memory storage controller by routing image data to the memory modules through memory controllers 402. Memory controller 216 also maintains a complete routing table for the image data, which is updated as memory modules and controllers are removed from and/or added to camera 400.

Figure 5:
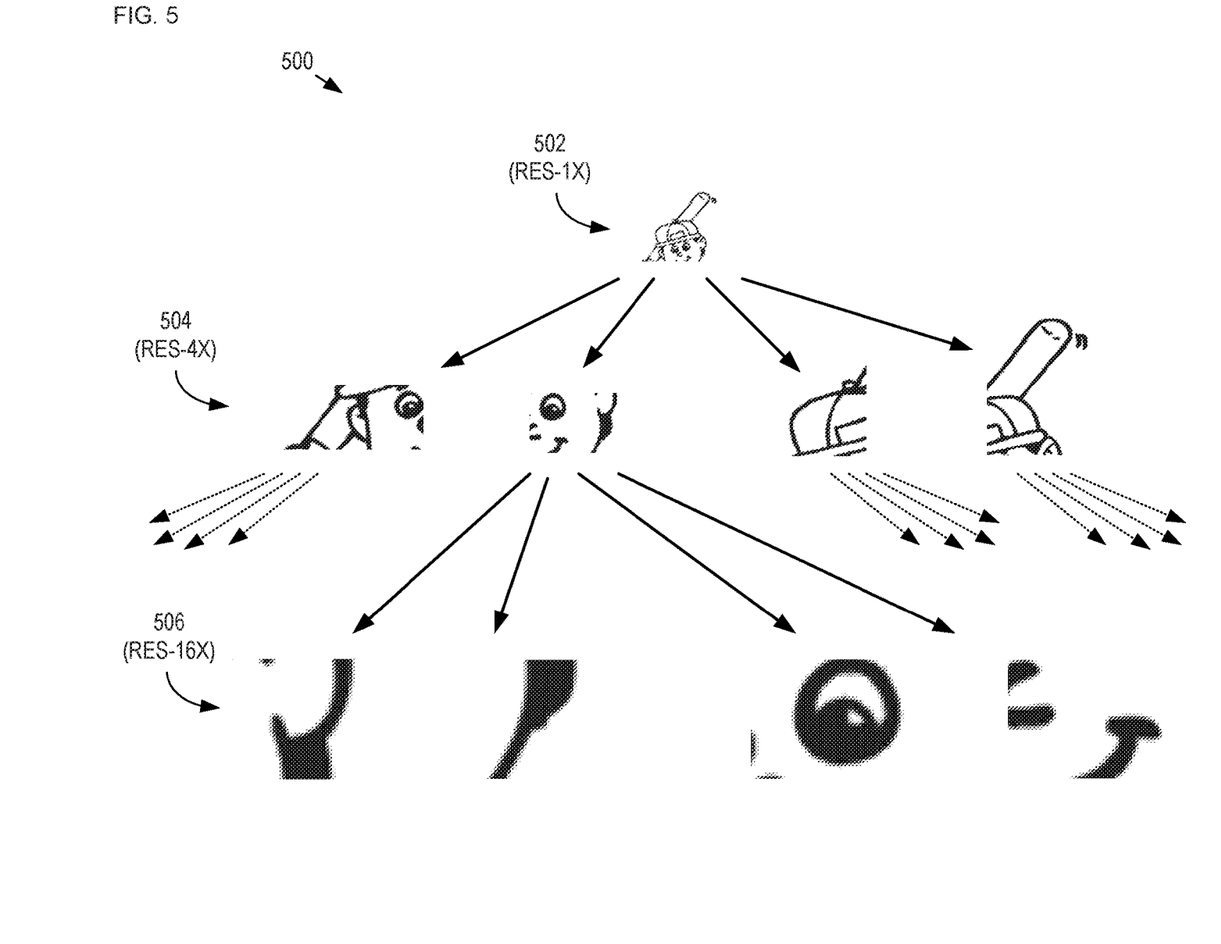
FIG. 5 depicts a representation of a processed image-data set stored as a hierarchical tree of resolution scales.

Returning now to the illustrative embodiment, FIG. 5 depicts a representation of a processed image-data set stored as a hierarchical tree of resolution scales. Image tree 500 represents a processed image-data set that is saved in memory modules 206 at different resolution scales. In the depicted example, image tree 500 depicts only processed image-data set 214-1; however, one skilled in the art will recognize, after reading this Specification, that all processed image-data sets would typically be stored in the same manner.

Digital image 502 represents the storage of processed image-data set 214-1 at its lowest resolution, which is denoted as resolution scale 1×.

Digital images 504 and 506 represent portions of digital image 502 stored at resolution scales 4 and 16 times greater, respectively, than that of digital image 502.

Although image tree 500 includes image portions stored at only three resolution scales, in some embodiments, image portions are stored at greater or fewer resolution scales. Further, in some embodiments, at least one resolution scale at which image portions are stored is other than 1×, 4×, and 16×.

Operations 301 through 303 are repeated for each video frame to give rise to an image data stream.

At operation 304, display command 218 is received from a user (e.g., broadcast director, gaming system, tracking algorithm, security system, etc.) at rendering computer 210. Command 218 defines the extent of a desired image portion, as well as the desired resolution at which that image portion is to be displayed. In some cases, display command might include other information about the manner in which the image data is to be displayed by rendering system 210.

At operation 305, rendering computer 306 issues display request 220 to memory controller 216, where the display request is based on display command 218. Rendering computer 210 issues display request 220 to request an image-data stream at the specified resolution scale. Since a full-resolution composite image (corresponding to data stitched from the sensor data from all of cameras 202) can be 100 megapixels to several gigapixels in size, it would be too large for reasonable transmission or display. Preferably, therefore, the request is for an image data stream that is smaller than the full-resolution composite image stream. The requested image stream can range from a low-resolution full-scale image stream of scene 108 to high-resolution image streams of a small portion of the scene. Typically, for lower-resolution video streams, the requested image-data stream is formed from low-resolution image data drawn from processed image data derived from image data provided by multiple imagers 202 or even all of the imagers. Alternatively, high-resolution video streams can comprise processed image data drawn from a single imager or small subset of imagers 202. In the depicted example, the video streams from different sub-imagers are matched in intensity and color levels by adjusting the video streams during capture in processors 204-1 to 204-3. In some embodiments, this matching is performed at rendering computer 210 with radiometric calibration coefficients. Further, in some embodiments, geometric warping of the images is performed to enable consistent display of a continuous image. Geometric warping of the images is preferably performed during capture in processors 204-1 to 204-3; however, it can also be performed at the rendering system using geometric calibration coefficients. By employing radiometric and geometric warping during capture, mass distribution of the video stream is facilitated due to the simpler video-tiling operations required to view the stream by multiple users.

At operation 306, rendering computer 210 aggregates the appropriate image data from one or more of memory modules 206 to render video stream 222 in accordance with display command 218.

As mentioned briefly above, array cameras in which each camera includes an independent memory lead to high-resolution data being drawn from a single memory module. That camera, therefore, would operate at high bandwidth while the remaining camera memories would remain idle. It is an aspect of the present invention, however, that using communications bus 208 distribute image data at various scales across memory modules 206 enables the read-out of image-data from the memory modules to be more evenly distributed, thereby making system operation more efficient.

In some embodiments, manner in which image data from each of imagers 202 is distributed among memory modules 206 is scaled according to resolution. For example, the lowest-resolution image-data stream from a single imager might be directed to a specific memory module 206 (e.g., memory module 206-4), the next highest resolution stream comprising four image-data streams (of comparable size to the low-resolution video stream) might be written to four of the memory modules, and the highest-resolution image-data stream might comprise sixteen video streams distributed across sixteen memory modules (for a system having sixteen memory modules 206).

When a highest-resolution video stream is requested by rendering computer 210, image-data streams obtained from a single imager 202 are read out from the sixteen memory modules in which they are stored. When a lowest-resolution video stream is requested by rendering computer 210, the low-resolution image-data stream is read out from the single memory module in which it is stored.

In each case, the data loads read from each memory module are constant and predictable. For embodiments comprising at least one high-resolution sensor array, an individual image can be further subdivided into separate streams, the size of which are optimized for the underlying hardware, data structures, and communications protocols to improve performance and storage efficiency. It should be noted that the distributed-memory approach affords embodiments of the present invention with particular advantages over the prior art in that it is particularly effective in allowing multiple render streams or viewers to simultaneously access the memory modules with different views of the same image-data stream.

In some embodiments, storage of image data from cameras 202 proceeds in a round-robin fashion, wherein the video frames from each imager are stored, one per memory module, indexing sequentially through the memory module array. For example, in the first video frame, processed image-data sets 214-1 and 214-6 are stored in memory module 206-1, processed image-data set 214-2 is stored in memory module 206-2, and so on. In the second video frame, processed image-data sets 214-1 and 214-6 are stored in memory module 206-2, processed image-data set 214-2 is stored in memory module 206-3, and so on, while processed image-data set 214-5 is stored in memory module 206-1. This continues through N video frames, where N is the number of memory modules 206, and then the process repeats with image-data sets 214-1 and 214-6 being stored in memory module 206-1, and so on.

By directing each camera module to start on a different memory module, constant bandwidth can be achieved and guaranteed on the capture and render streams. Multi-resolution streams could be stored with the same protocol and achieve similar consistency in bandwidth. This approach also provides some level in redundancy in the event of storage component failure. Instead of losing the full stream from a given microcamera, the $N^{th}$ frame from all the cameras would be lost. One skilled in the art will recognize that myriad alternative redundant algorithms can be integrated as part of the storage strategy without departing from the scope of the present invention.

It is to be understood that the disclosure teaches some examples of embodiments of the present invention and that many variations of the invention can easily be devised by those skilled in the art after reading this disclosure and that the scope of the present invention is to be determined by the following claims.

What is claimed is:

1. A system for forming an image of a scene, the system comprising:
   (1) a plurality of imagers that is operative for providing a plurality of image-data sets, each imager including:
      a first lens; and
      a sensor array that is operative for receiving an optical sub-image of the scene from the first lens and providing an image-data set of the plurality thereof, the image-data set being based on the received optical sub-image;
   (2) a plurality of processors that is operative for receiving the plurality of image-data sets and providing a plurality of processed image-data sets; and
   (3) a plurality of memory modules, each of the plurality of memory modules being operative for storing a processed image-data set from each of at least two of the plurality of imagers, wherein said processed image-data at different resolution scales are distributed across the plurality of memory modules based on the resolution scale.

2. The system of claim 1 wherein at least one of the plurality of processors is operatively coupled with at least two imagers of the plurality thereof such that the at least one processor receives at least two image-data sets of the plurality thereof.

3. The system of claim 1 wherein at least one of the plurality of memory modules is operative for storing a first processed image-data set at a plurality of resolution scales.

4. The system of claim 3 wherein the plurality of memory modules is operative for storing a first processed image-data set at a hierarchy of resolution scales.

5. The system of claim 1 further comprising (4) a rendering processor that is operative for:
   requesting an image of the scene at a first resolution scale; and
   forming a composite image of the scene based on at least a first processed image-data set and a second processed image-data set of the plurality thereof received from a first memory module and second memory module of the plurality thereof.

6. The system of claim 1 further comprising (4) an objective lens that is operative for forming an intermediate image of the scene at a first focal region, wherein the plurality of imagers and the objective lens are arranged such that each first lens of the plurality thereof forms its respective optical sub-image by relaying a portion of the intermediate image onto its respective sensor array.

7. The system of claim 1 wherein the plurality of processors and the plurality of imagers are arranged such that at least one of the plurality of imagers provides a different portion of its respective image-data set to each of at least two processors of the plurality thereof.

8. The system of claim 1 further comprising an image-rendering processor that is operative for rendering an image of the scene based on processed image-data sets stored in a plurality of memory modules.

9. The system of claim 1 further comprising a first memory controller operative for routing image data to memory locations in the plurality of memory modules and maintaining a routing table for the stored image data.

10. The system of claim 9 further comprising a second memory controller and a third memory controller, each of the second and third memory controllers being operative for routing image data to at least one memory module of the plurality thereof and maintaining a routing table for the image data stored in its respective at least one memory module, wherein the second and third memory controllers route image data to different memory modules of the plurality thereof.

11. A method for forming an image of a scene, the method comprising:
providing a plurality of imagers, each imager comprising a sensor array and a lens that forms an optical sub-image of the scene on the sensor array;
providing a plurality of first image-data sets, wherein each first image-data set of the plurality thereof is based on a different optical sub-image of the plurality thereof; and
storing the plurality of first image-data sets in a plurality of memory modules such that each first image-data set is distributed among a plurality of memory modules wherein said processed image-data at different resolution scales are distributed across the plurality of memory modules based on the resolution scale.

12. The method of claim 11 further comprising:
at each sensor array of the plurality thereof, converting the optical sub-image into a second image-data set; and
processing the plurality of second image-data sets to provide the plurality of first image-data sets.

13. The method of claim 12 further comprising:
providing a plurality of processors for processing the plurality of second image-data sets; and
arranging the plurality of processors and the plurality of sensor arrays such that each sensor array provides its second image-data set to at least two processors of the plurality thereof.

14. The method of claim 12 further comprising forming an intermediate image of the scene at a first image field, wherein each lens of the plurality thereof forms its respective sub-image by relaying a portion of the intermediate image onto its respective sensor array.

15. The method of claim 11 wherein at least one first image-data set of the plurality thereof is stored in the plurality of memory modules at each of a plurality of resolution scales.

16. The method of claim 11 wherein at least one first image-data set of the plurality thereof is stored in the plurality of memory modules at a hierarchy of resolution scales.

17. The method of claim 11 further comprising:
retrieving image data from a plurality of memory modules, wherein the retrieved image data is included in at least one first image-data set; and
rendering the image of the scene based on the retrieved image data.

18. The method of claim 17 wherein the image data is retrieved from N memory modules, wherein N is based on the resolution scale at which the image is rendered.

* * * * *